United States Patent [19]
Roslan

[11] Patent Number: 5,295,221
[45] Date of Patent: Mar. 15, 1994

[54] COMPACT, LIGHT EFFICIENT, ILLUMINATED TRANSPARENCY FRAME

[75] Inventor: Thomas W. Roslan, Van Nuys, Calif.

[73] Assignee: Light Quest Corporation, Malibu, Calif.

[21] Appl. No.: 985,166

[22] Filed: Dec. 1, 1992

[51] Int. Cl.⁵ .............................................. G02B 6/00
[52] U.S. Cl. ..................................... 385/147; 40/547; 362/32; 385/901
[58] Field of Search .................. 385/147, 901; 40/546, 40/547; 362/32

[56] References Cited

U.S. PATENT DOCUMENTS

| | | | |
|---|---|---|---|
| 4,260,220 | 4/1981 | Whitehead | 350/96.28 |
| 4,615,579 | 10/1986 | Whitehead | 350/96.1 |
| 5,138,783 | 8/1992 | Forsse | 40/546 |

OTHER PUBLICATIONS

"3M Scotch ™ Optical Lighting Film Application Bulletin Thin Light Box" (11 pages), No. 75-0299-60-17-8, dated Nov. 1988, Special Enterprises Program, 3M Traffic Control Materials Division.
"3M Scotch ™ Optical Lighting Film Assembly Instructions Thin Light Box Inserts" (4 pages), No. 75-02-99-6016-0, dated Nov. 1988, Special Enterprises Program, 3M Traffic Control Materials Division.
"Scotchlamp Film ™" (12 pages), No. 78-6970-27-73-4, undated Special Enterprises Dept., 3M Traffic Control Materials Div.
"3M Scotch ™ Optical Lighting Film General Theory" (8 pages), No. 75-0299-6018-6, dated Nov. 1988, Special Enterprises Program, 3M Traffic Control Materials Division.
"3M Scotch ™ Optical Lighting Film Specification Sheet" (3 pages), No. 75-0299-5727-3, dated Nov. 1988, Special Enterprises Program, 3M Traffic Control Materials Division.
"Product Bulletin V-5115" entitled Scotch ™ Light Extractor Film V-5115 (2 pages), No. 75-5100-0145-8, dated Jul. 1989, 3M Commercial Graphics Division.
"Product Information Scotchmark ® Identification Systems" entitled Scotch ™ 467MP and 468MP Laminating Adhesives (4 pages), No. 70-0701-2468-3, Converter Specialties Division/3M (undated).
"Progress in the development of prism light guides" by Steven G. Saxe, Lorne A. Whitehead and Sanford Cobb, Jr., Proceedings of the Society of Photo-optical Instrumentation Engineers (SPIE), vol. 692, pp. 235-240 (Aug. 1986).
3M publication entitled "3M Brand Scotch Lamp Film ™" (3 pages), undated.
3M publication entitled "3M Brand Scotch Lamp Film ™" (4 pages), undated.

Primary Examiner—John D. Lee
Attorney, Agent, or Firm—Blakely, Sokoloff, Taylor, Zafman

[57] ABSTRACT

A frame (20), for illuminating a depiction on a transparency (50) with full illumination or with highlighting, shadowing and dramatic illumination, includes a front panel (36), a back panel (38), a bottom lens panel (40), a top panel (42) and pair of side panels (44). Each panel includes its own light guiding groove arrangement of a SCOTCH ™ optical lighting film (SOLF) (50, 70, 88, 108, 126, 146, 160) and whole portions or segments of a light extractor film (84, 98, 104, 136, 156, 158) for either directing the light from a fluorescent bulb (48) along the SOLF light guides or into patterns of light onto and through transparency (50). The SOLF grooves transmit the light in the direction of double headed arrows (78) in bottom lens panel (40) toward side panels (44), which direct the light as shown by double headed arrows (96). The grooves in top panel (42), as portrayed by double headed arrow lines (116) guide the light in a wrapped arround manner between front and back panels (36, 38). Grooves (132, 152, 64) in respective back panels (38a, , 38b) and in front panel (36) extend between top panel (42) and bottom lens panel (40). Grooves (76) in bottom lens panel (40) direct light parrallel to the axis of the flourescent bulb (46) while all other grooves, including light wrap-around grooves (114) in top panel (42), direct light perpendicular to the bulb axis.

22 Claims, 5 Drawing Sheets

COMPACT, LIGHT EFFICIENT, ILLUMINATED TRANSPARENCY FRAME

BACKGROUND OF THE INVENTION

1. Field of the Invention

The present invention relates to a frame for illuminating a transparency, which may include translucent matter, such as for back-lighting of photographic or other depictions and, more particularly, to such an illuminated frame which is in the nature of a picture frame and which is both compact in size and efficient in applying light for full illumination or for highlighting, shadowing and other dramatic illumination of the transparency.

2. Description of Related Art and Other Considerations

In the following description, the materials used in the present invention comprise optical lighting and light extractor films, which are obtainable from several sources. However, the preferred materials are those manufactured by 3M Company under its trade name "SOLF" (an acronym for its SCOTCH TM Optical Lighting Film) and its extractor film. These and related materials are described, at least in part, in U.S. Pat. Nos. 4,260,220, 4,542,449, 4,615,579, 4,750,798, 4,787,708 and 4,791,450, whose disclosures are incorporated herein as if set forth in haec verba. However, it is to be understood that any like materials, which are obtainable from other sources and can perform equivalently, may be used in the present invention. Nevertheless, because the preferred materials comprise those obtainable from 3M, the following presentation emphasizes their employ, although it is not intended that the present invention be limited thereto.

Existing illuminators or light boxes and their constituent materials, such as are manufactured by or with materials originating from 3M Company, are described in several of its publications emanating from its Special Enterprises Department, 3M Traffic Control Materials Division, numbers 75-0299-6017-8 and 75-0299-6016-0, both dated November 1988, and respectively entitled "3M SCOTCH TM OPTICAL LIGHTING FILM APPLICATION BULLETIN THIN LIGHT BOX" and "3M SCOTCH TM OPTICAL LIGHTING FILM ASSEMBLY INSTRUCTIONS THIN LIGHT BOX INSERTS."

Such a thin light box and its materials are also described in other 3M publications entitled "SCOTCHLAMP FILM TM", number 78-6970-2773-4, "3M SCOTCH TM OPTICAL LIGHTING FILM GENERAL THEORY," number 75-0299-6018-6, dated November 1988, "3M SCOTCH TM OPTICAL LIGHTING FILM SPECIFICATION SHEET," number 75-0299-5727-3, dated November 1988, "Product Bulletin V-5115" entitled "Scotch TM Light Extractor Film V-5115," number 75-5100-0145-8, dated July 1989, and a brochure entitled "Product Information" entitled "Scotch TM 467MP and 468MP Laminating Adhesives," number 70-0701-2468-3.

Aspects of such a 3M thin light box are described in two papers entitled "Progress in the development of prism light guides" by Steven G. Saxe, Lorne A. Whitehead and Sanford Cobb, Jr., Proceedings of the Society of Photo-optical Instrumentation Engineers (SPIE), volume 692, pages 235–240 (1986), and in above-mentioned U.S. Pat. Nos. 4,260,220 and 4,615,579 by Lorne A. Whitehead. Two other 3M publications are both entitled "3M BRAND SCOTCH LAMP FILM TM." Mention is also made to the other above-referenced U.S. Pat. Nos. 4,542,449, 4,750,798, 4,787,708 and 4,791,450.

Two important materials utilized in the 3M thin light box include SOLF (an acronym for 3M SCOTCH TM Optical Lighting Film and sometimes referred to by 3M as "SCOTCHLAMP FILM TM") and a light extractor film, both of which are described in one or more of the above publications.

As described, for example, in above-identified 3M publication number 78-6970-2773-4 entitled "SCOTCHLAMP FILM TM", the SOLF is defined as a clear 0.022" thick acrylic or 0.020" thick polycarbonate film which is manufactured using a 3M microreprocation process to provide very precise prism grooves on one side and a mirror-like plano finish on the other. According to above-referenced U.S. Pat. No. 4,260,220, these grooves form a light guide which is capable of effectively guiding light by total internal reflection in which its planar inner and outer surfaces are defined as being in "octature."

The light extractor film comprises a diffuse, reflecting material, is utilized when it is desirable to have the light escape from the SOLF, and functions to change the direction of the light rays, causing them to scatter and penetrate the film in the desired areas. Particular reference is also made to 3M SOLF Application Bulletin, number 75-0299-6017-8 which contains information necessary for the design and construction of a thin, back-lit display box using SOLF. The extractor film typically is fabricated with a self-adhering adhesive on one surface.

Thin light boxes constructed according to the above publications are limited to relatively large sizes and wattage. Light is directed into the interior of the box from all sides, and a mirrored surface, for example, of silvered Mylar film, is used at the box end, which is opposite from the light bulb end, to redirect the light back into the interior. The SOLF is arranged so that its mirror-like side always faces the light source. To provide the desired light output from such boxes, a minimum 40 watt fluorescent bulb is required. Such a relatively large fluorescent bulb increases the thickness of the box, having a typical small size of 4' by 6', with a 6" to 12" depth, although some depths may have been reduced to a minimum of 2½". Furthermore, 3M personnel emphasize that the SOLF surfaces must not be damaged so that the light carrying or light reflective qualities of the box materials will not be diminished. Accordingly, it is not practicable to utilize such a light box for other than large outdoor or other industrial displays. Such boxes are not adaptable or at least easily amenable to home or office use, or as an archival light box such as might be employed in a museum, or as a picture-like frame. It is conventional opinion that smaller sizes are not possible or practicable.

SUMMARY OF THE INVENTION

These considerations, and conventional thinking, are successfully addressed and rebutted by the present invention. Briefly, the SOLF and the extractor film are arranged to guide the light in desired directions and novel patterns to provide unexpected efficiency, so that the application of the light to back-light a transparency with a depiction thereon maximizes the illumination of the depiction. The proper placement and use of extractor film, in conjunction with the SOLF, facilitate highlighting and/or shadowing of the transparency.

Placement of the extractor film on the SOLF provides a dual purpose, depending upon whether it is placed on the grooved side or on the mirror-like side of the SOLF, or whether a side of the SOLF is free from the extractor film. When placed in contact with the mirror-like side, the extractor film both acts as a reflective tube wall to help direct the light in the direction of the SOLF grooves and permits light to be extended out of the SOLF into the interior of the light frame or illuminator. Where light is not to be extracted into the interior, such as at the frame end opposite from the light bulb end, no extractor film is placed on the SOLF. When the extractor film is placed in contact with the grooved side of the SOLF, the extractor film operates solely as a reflective light conduit wall and prevents light from escaping from the SOLF, and helps to pipe the light in the direction of the grooves. The mirror-like side of the SOLF can also be roughened or scoured to affect its light transmitting characteristics.

As an example in the preferred embodiment of the present invention, a plurality of panels are arranged in a frame-like configuration, so as to provide a six sided enclosure, including a bottom lens panel, a top panel, a front panel, a back panel and two side panels. The panels are provided with SOLF alone and SOLF with extractor film. A source of light is positioned behind the bottom lens panel. The front panel is arranged to support the transparency.

Light from the bottom lens panel is directed to the two side panels, the front panel and the back panel. The grooves within the SOLF are disposed to guide the light from the bottom lens panel to the side panels, the front panel and the back panel. The SOLF in the top panel is disposed to guide the light from the back panel to the front panel. The extractor film is disposed with respect to the SOLF so as to insure that the light will be directed as desired. Light directing and blocking arrangements are provided in the back panel and cooperate with the SOLF for conditioning the light directed onto the depiction in the transparency so as to provide a full even illumination, or highlighting, shadowing and other dramatic illumination.

Several advantages are derived from this arrangement. Light is more efficiently used over that provided by conventional constructions. Thus, it is possible to utilize the smallest available diameter light bulbs, whose size is dependent solely upon those bulbs which are available from the manufacturer. The efficient use of light and the ability to utilize the smallest possible diameter light bulbs enables the illuminators or light frames to be more compact than could be previously obtained, e.g., of 1.85" in depth or thickness, which is a reason why the present invention may be viewed as being more like a picture frame rather than a prior art light box. Such efficiency results in lower costs stemming from reduced power requirements, and the smaller sizes. The lower cost and size also enable the present invention to be adapted for home, office and museum or archival use. The light transmission characteristics are conditioned to provide full illumination or highlighting, shadowing and other dramatic illumination of the depictions on the transparency.

Other aims and advantages, as well as a more complete understanding of the present invention, will appear from the following explanation of exemplary embodiments and the accompanying drawings thereof.

DETAILED DESCRIPTION OF THE PREFERRED EMBODIMENTS

Accordingly, with reference to FIGS. 1-4, an illuminator or light frame 20 comprises a front section 22 supporting a transparency, a back section 24 spaced from front section 22, a bottom lens section 26, a top section 28 and a pair of side sections 30. The sections are assembled together by a frame 32, such as of extruded aluminum, into a frame-like or parallelepiped configuration having an internal space 33. Frame 32 is formed to provide channels 34 for six variously configured panels which are more fully described with respect to FIGS. 2A and 5–17 and comprises a front panel 36, a back panel 38, a bottom lens panel 40, a top panel 42, and a pair of side panels 44. Accordingly, front section 22 may be said to comprise front panel 36 and that portion of frame 32 housing the front panel. In like manner, back section 24, bottom lens section 26, top section 28 and side sections 30 respectively comprise their back, bottom, top and side panels 38–44 and the respective portions of frame 32 which house the several panels.

A fluorescent bulb or light 46 is positioned within bottom lens section 26 and extends generally between side sections 30. Fluorescent bulb 46 is positioned behind bottom lens panel 40 and, to improve the reflective qualities of the light emitted from the fluorescent bulb, a white reflective surface film 48, preferably an extractor film, is placed on all of the inner surfaces of frame 32 in the bottom lens section on all walls surrounding bulb 46. Accordingly, light from bulb 46 is efficiently directed to bottom lens panel 40.

Figures 1, 2, 2A, 3:
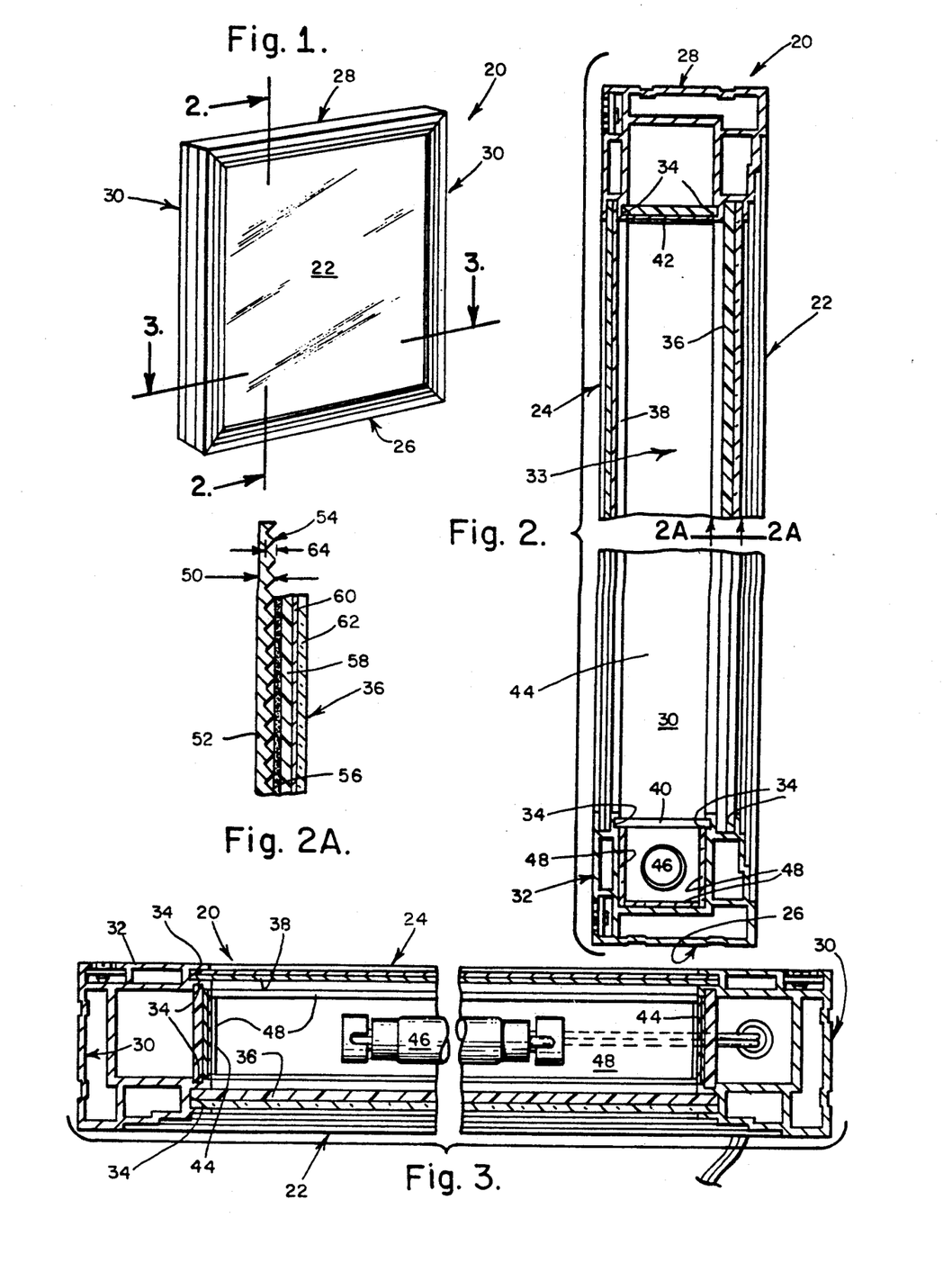
FIG. 1 is a three-dimensional view of an illuminator or light frame embodying the inventive concepts herein.
FIG. 2 is a cross-sectional view of the present invention taken along line 2—2 of FIG. 1.
FIG. 2A is a cross-sectional view of the front panel and transparency therein taken along line 2A—2A of FIG. 2.
FIG. 3 is a cross-section of the present invention taken along line 3—3 of FIG. 1.

Reference is now made to the specific construction of the several panels. As illustrated in FIG. 2A, front panel 36 comprises an inner layer 50 of SOLF (which, as stated above, is an acronym for SCOTCH ™ optical lighting film) having a mirror-like surface 52 facing interior 33 of illuminator 20 and a grooved surface 54 facing outwardly from the interior. SOLF 50 is adhered by a clear adhesive film 56 to a translucent sheet 58, such as of acrylic plastic. It is important that adhesive film 56, like all such films used herein, comprise a film, as distinguished from an adhesive per se, e.g., in spray or free-standing form, to preclude adhesive from filling the grooves of surface 54, as further aided by the groove depth (typically 0.007") which is greater than the adhesive film thickness (typically 0.001"). A transparency 60 having a depiction thereon is placed against acrylic sheet 58 and held thereagainst by a clear glass or acrylic pane 62. Grooved surface 54 is so positioned that its grooves 64 extend between top panel 42 and bottom lens panel 40.

Figure 4:
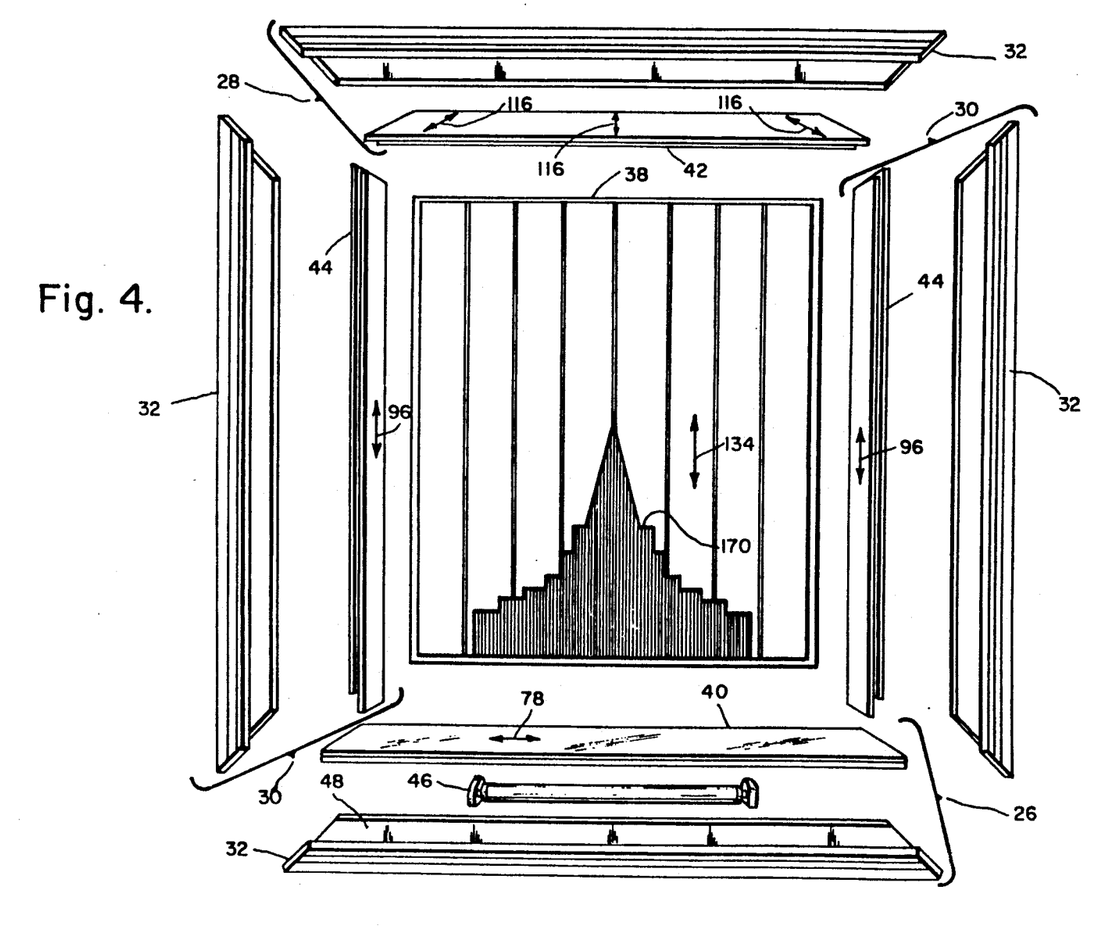
FIG. 4 is an exploded view of the arrangement depicted in FIG. 1 and illustrating one pattern of SOLF and extractor films useful in the back panel, the grooves in the underside of the SOLF sheet being seen through the clear material of which it is constituted.
Figures 5, 6:
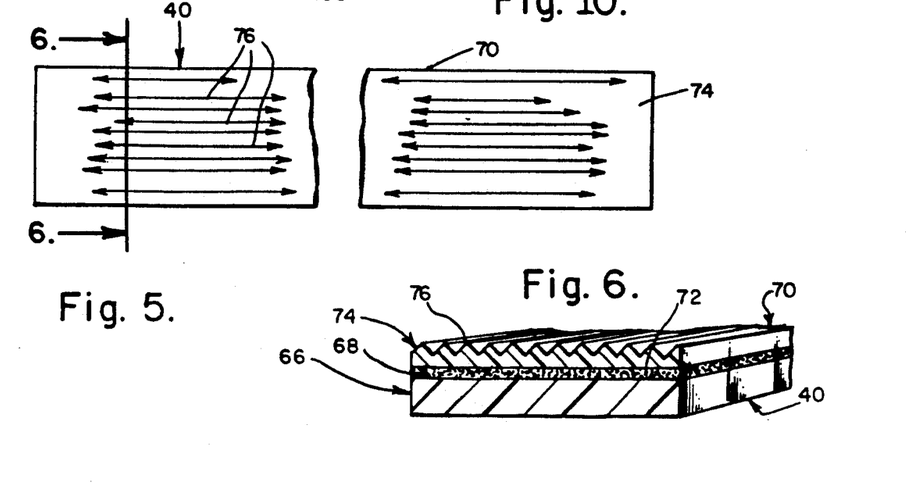
FIG. 5 is a top view of the bottom lens panel of FIG. 1, showing the grooves on the upperside of the SOLF sheet.
FIG. 6 is a cross-sectional view of the bottom panel, acting as a lens, taken along line 6—6 of FIG. 5, showing its constituent parts.

Referring to FIGS. 5 and 6, bottom lens panel 40 comprises a base 66 formed of a clear material, such as of acrylic plastic. The sides of base 66 are disposed to fit within channels 34 of that portion of frame 32 which forms bottom lens panel section 26. A SOLF sheet 70 is bonded to the entirety of base 66 by a clear adhesive film 68. SOLF sheet 70 has a mirror-like surface 72 adhered by clear adhesive film 68 to acrylic sheet 66. Grooved surface 74 faces interior 33 of illuminator 20 and its grooves 76 are so positioned that they extend from one side panel 44 to the other side panel 44. This disposition of grooves 76 is illustrated by double headed arrow line 78 in FIG. 4.

Figures 7, 8:
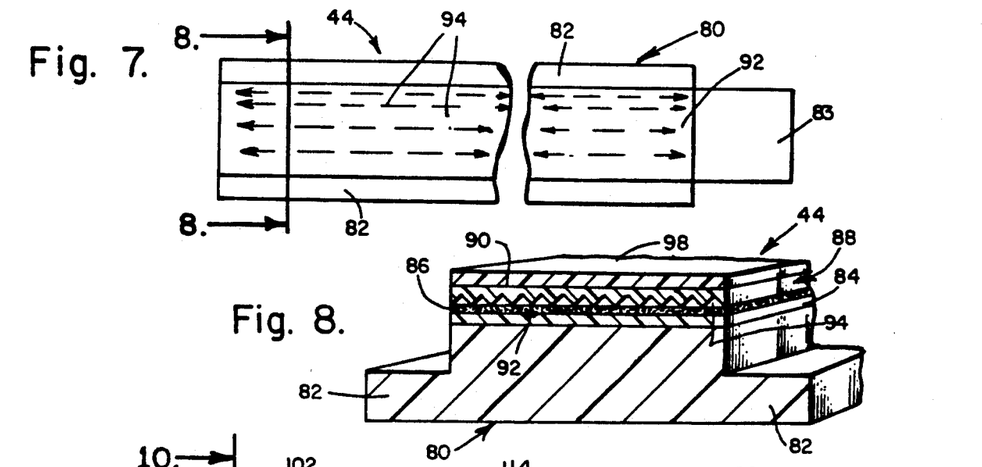
FIG. 7 is a view of a side panel of the FIG. 1 construction, showing the direction of the light being guided by the SOLF grooves, which are on the underside of the clear SOLF material.
FIG. 8 is a cross-section of the side panel shown in FIG. 7 taken along line 8—8 thereof to illustrate the orientation of the several materials used therein.

As shown in FIGS. 7 and 8, each side panel 44 comprises a supporting base 80 of white ABS plastic. Base 80 is provided with ears 82 which are sized to fit within channels 34 of that portion of frame 32 which forms side sections 30. A tongue 83 extends from one end of base 80 and past bottom lens panel 40 to block light from escaping at the intersection between each side panel 44 and its adjacent bottom lens panel 40. An extractor film 84 having a self-sticking adhesive surface is adhered to base 80. A clear adhesive film 86 is placed on the opposite surface of extractor film 84.

A SOLF sheet 88 is secured by adhesive film 86 to extractor film 84. SOLF sheet 88 has its mirror-like surface 90 extending toward the interior of illuminator 20 and its grooved surface 92, having grooves 94 therein, is adhered to extractor film 84 by adhesive film 86. Because SOLF sheet 88 is of a clear material, grooves 94 can be seen. Grooves 94 are disposed so that they extend lengthwise of the panel, that is, they extend between top panel 42 and bottom lens panel 40 and, as shown in FIG. 4, in the direction of double-headed arrow lines 96. Extractor film 84, in conjunction with white ABS base 80, ensures that light is reflected into and retained within SOLF sheet 88 and is directed along grooves 94.

A further extractor film 98 is adhered at its self-sticking side to mirror-like surface 90 of SOLF sheet 88, so that extractor film 98 faces interior 33 of the illuminator. Extractor film 98 has a dual purpose. First, when in contact with the smooth or mirror-like side of the SOLF, it acts as a tube or conduit wall to help direct light along the groove direction and, second, it permits some light to be extracted out of the SOLF and into the interior of the frame for lighting the viewing panel.

The arrangement of base 80 and the several layers of extractor film 84, clear adhesive film 86, SOLF sheet 88, and extractor film 98 is such that their end surfaces adjacent tongue 83 permits these films and sheets to be in good optical communication with sheet 70 of bottom lens panel 40.

Figures 9, 10:
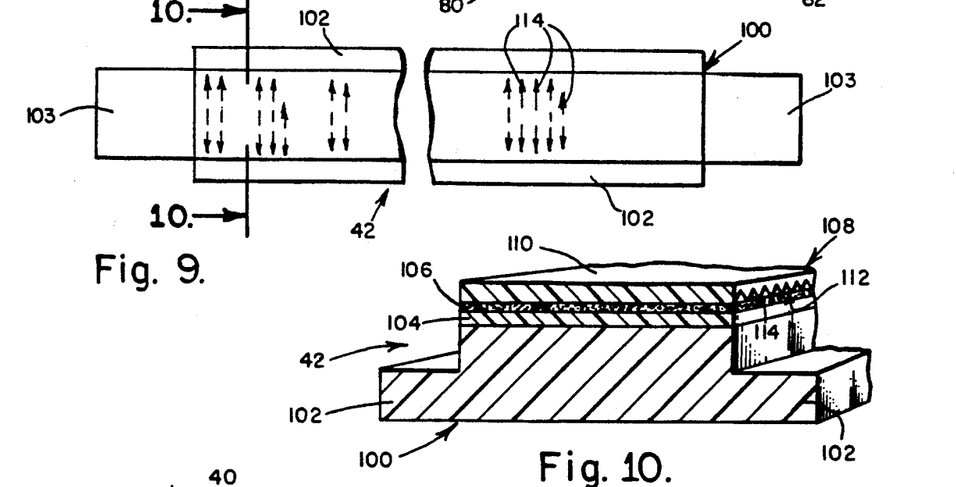
FIGS. 9 and 10 are views of the top panel and its cross-section showing its constituent parts, in which the grooves, in the underside of the SOLF sheet in FIG. 9 can be seen through the clear material of which it is formed.

FIGS. 9 and 10 depict top panel 42. The top panel includes a base 100 of white ABS plastic. Base 100 is provided with ears 102 which are disposed to fit within channels 34 of that portion of frame 32 which forms top section 28. Tongues 103 extend from both ends of base 100 to block light from escaping at its intersections with both of its adjacent side panels 44. An extractor film 104 is adhered to base 100 and has an added layer of clear adhesive film 106 for securing a SOLF sheet 108 thereto. SOLF sheet 108 is provided with a mirror-like surface 110 which faces interior 33 of illuminator 20 and a grooved surface 112 which faces extractor film 104. Grooved surface 112 is provided with grooves 114 which face away from illuminator interior 33. Although grooves 114 are on the underside of SOLF sheet 108, because the SOLF sheet is formed from a clear material, the grooves are visible in FIG. 9. The direction of grooves 114 is illustrated as a double headed arrow line 116 shown in FIG. 4 to show that light is directed between front and back panels 36 and 38 in a wrap-around manner. Extractor film 104 operates like extractor film 84 for side panel 44 of FIGS. 7 and 8. There is no extractor film on mirror-like surface 110 of SOLF 88, because it is not desired that light be extracted from top panel 42 into illuminator interior 33, but only that the top panel function to wrap around the light between the front and back panels 36 and 38.

FIGS. 11–17 depict three arrangements of the SOLF and extractor films on their respective back panels 38a, 38b and 38c. In these arrangements, the cross-sectional views depicted in FIGS. 12 and 13 and in FIGS. 15 and 16, for purposes of illustration, greatly exaggerate the slopes of some of the films. In reality, because the various films and sheets are only a few thousandths of an inch thick, the actual steps are accordingly much smaller. In addition, the grooves in all FIGS. 11–17 are on the underside surfaces of their respective SOLF sheets which, because they are made of a clear material, the grooves can be seen therethrough.

Figure 11:
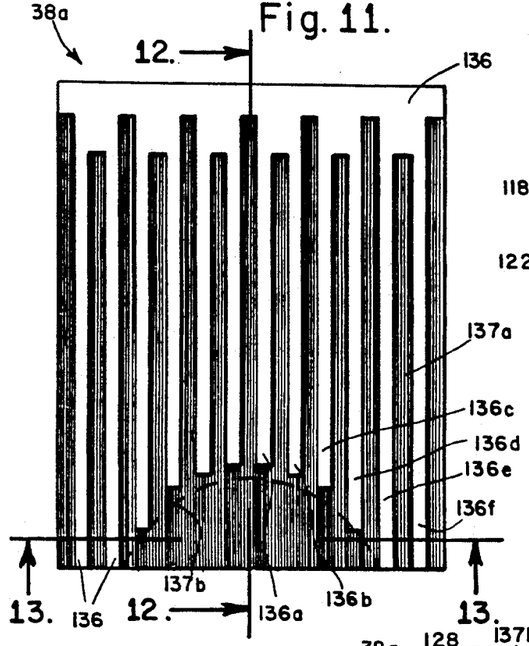
FIG. 11 is a view of the back panel with an alternate pattern of SOLF and extractor films utilizable in the embodiment depicted in FIG. 1, the grooves in the underside of the SOLF sheet being seen through the clear material of which it is constituted.
Figure 12:
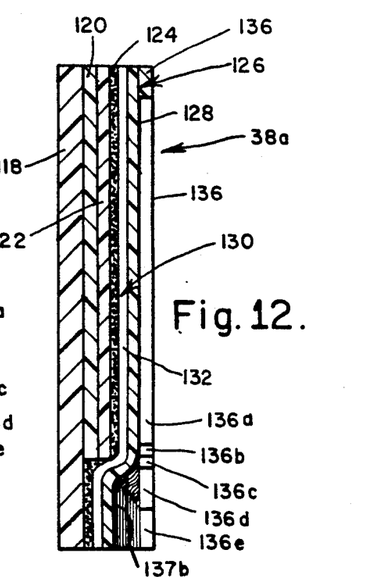
FIGS. 12 and 13 are sections respectively taken along lines 12—12 and 13—13 of FIG. 11, and showing the grooves on the underside of the clear SOLF material.
Figure 13:
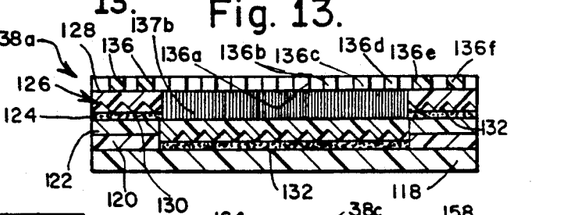

As shown in FIGS. 11–13, back panel 38a includes a base 118 of black ABS plastic, its color being black only for aesthetic reasons. A pair of sheets or layers 120 and 122 of extractor film are adhered to base 118 to form respective double layers of extractor film. Placed above all upper surfaces of extractor film layer 122 and exposed portions of base 118 is a layer of clear adhesive film 124. A SOLF sheet 126 is secured by adhesive film 124 to upper extractor film layer 122 and to the exposed portions of base 118 not covered by extractor film layers 120 and 122. SOLF sheet 126 is positioned so that its mirror-like surface 128 extends toward interior 33 of illuminator 20. Accordingly, grooved surface 130 of SOLF sheet 126 is bonded to clear adhesive film 124. Grooves 132 of grooved surface 130 are disposed to extend in the direction of double headed arrow line 134, which is shown in FIG. 4.

Extractor film 136 in tape form is adhered to mirror-like surface 128 of SOLF sheet 126, and is patterned as having longitudinally-extending portions 136a–136f of varying lengths, as best illustrated in FIGS. 11 and 13 to provide longitudinally-extending exposed and covered portions of mirror-like surface 128. This patterning formed by the placement and differing lengths of extractor film portions 136a–136f exposes mirror-like surface 128 of SOLF sheet 126 into a plurality of longitudinally-extending portions 137a as well as into a semicircular area 137b. Portions 137a provide a diminishing of the light for light dimming or shading purposes, such as for highlighting, shadowing and related dramatic illumination of the transparency and its particular depiction. Semicircular area 137b is used in conjunction with the light source to prevent excessive light refractions adjacent thereto from overly brightening the transparency. This pattern is designed to provide a pattern of the light onto front panel 36 for even illumination over the entire viewing area of transparency 60.

Figure 14:
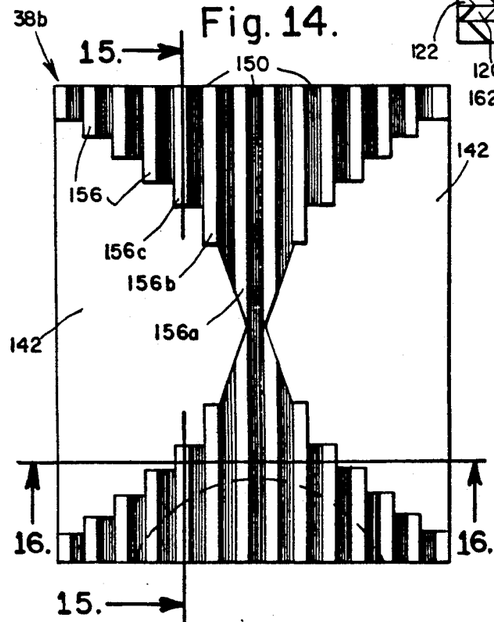
FIG. 14 is a view of another embodiment of the back panel of the SOLF and extractor film pattern, the grooves in the underside of the SOLF sheet being seen through the clear material of which it is constituted.
Figure 15:
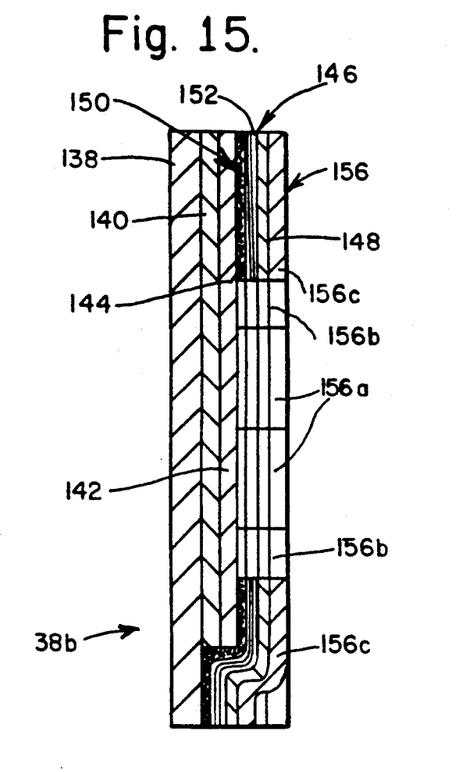
FIGS. 15 and 16 are cross-sectional views respectively taken along lines 15—15 and 16—16 of FIG. 14.
Figure 16:
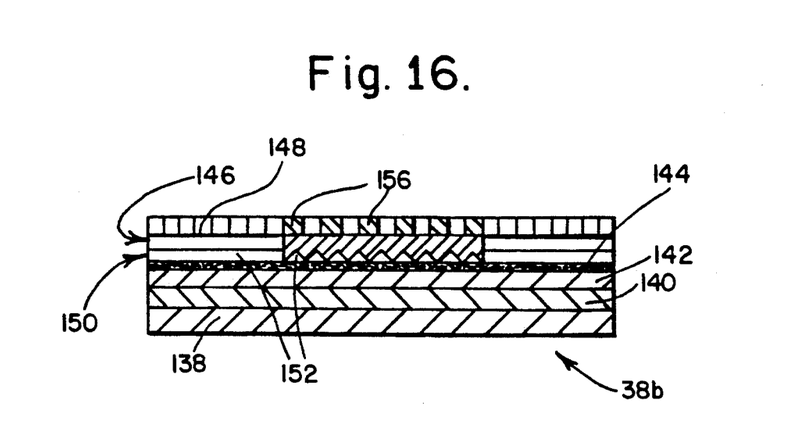

Referring now to FIG. 14–16, back panel 38b includes a base 138 of black ABS plastic to which double layers 140 and 142 of extractor film and longitudinally-extending portions thereof are adhered. A clear adhesive film 144 secures a SOLF sheet 146 to upper layer 142 of the extractor film, such that its mirror-like surface 148 faces away from extractor film layers 140 and 142 while its grooved surface 150 faces layers 140 and 142 and is secured to extractor film 142 by adhesive film 144. Grooves 152 in surface 150 extend in the direction of double-headed arrow line 134 of FIG. 4. A pattern 156 of extractor film including longitudinally-extending portions 156a–156c (see also FIG. 14) is adhered to mirror-like surface 148 of SOLF sheet 146 to provide uncovered portions of its mirror-like surface.

Figure 17:
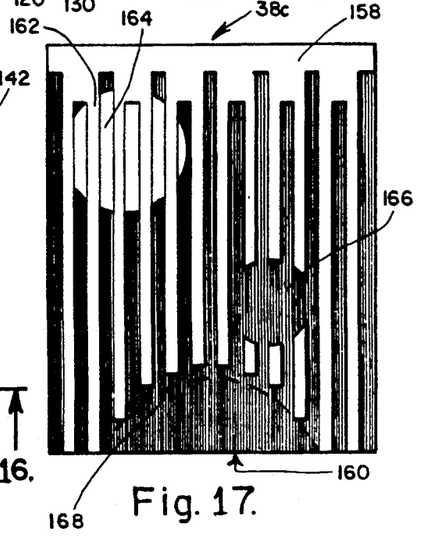
FIG. 17 is a view of a third arrangement of the back panel SOLF and extractor film pattern, illustrating the grooves on the underside of the SOLF through its clear material, and showing how the depiction in the transparency may be customized through highlighting and darkening.

FIG. 17 discloses still a further pattern 158 of extractor film placed atop a sheet 160 of SOLF in back panel 38c. Here, extractor film pattern 158 includes longitudinally extending portions 162 and a circular portion 164 formed of strips of extractor film added to portions 162, while leaving an exposed circular area 166 and an exposed semicircular area 168 of SOLF sheet 160. Circular portion 164 and circular area 166 are used for light dimming or shading purposes and, to provide for highlighting, shadowing and related dramatic illumination of the transparency and its particular depiction. Semicircular area 168 is used in conjunction with the light source to prevent excessive light refractions adjacent thereto from overly brightening the transparency.

It is to be understood that the configurations of circular portion 164 and circular area 166 are solely for purposes of illustrating the present invention and, therefore, may take any desired shape, such as a curved, rectangular, polygonal and irregular shape.

These patterns depicted in FIGS. 11, 14 and 17 are representative of different patterns of extractor film placed upon a SOLF which vary from the form of a pattern 170 of extractor film shown in FIG. 4. In addition, the patterns can be sized and shaped to conform them to the light pattern emanating from the shape and length of the light bulb.

Portions of the smooth surface of the SOLF of the panels may be roughened or scoured by steel wool or other suitable means to dim or shade the point of entry of the light. Such scouring performs the same function as the cut-away portions 137b and 168 of FIGS. 11 and 17 and, when used in combination therewith, enhances their light diminishing properties.

Although the invention has been described with respect to particular embodiments thereof, it should be realized that various changes and modifications may be made therein without departing from the spirit and scope of the invention.

What is claimed is:

1. A compact, light efficient, illuminated transparency frame for illuminating a depiction, comprising:
    a plurality of panels provided with light guides, said panels including a bottom lens panel, a top panel, a front panel, a back panel, two side panels and a frame for holding and securing said panels into an enclosure having a parallelepiped configuration bounding an open interior;
    a source of light positioned behind said bottom lens panel, and separated from the open interior thereby;
    said light guides in said bottom lens panel being disposed to direct the light towards both said side panels;
    said light guides in said side panels respectively being disposed to direct the light towards said top panel;
    said light guides in said top panel being disposed to redirect the light towards said front and back panels;
    said front panel including a clear cover for sandwiching the depiction to be illuminated between said cover and said front panel light guides;
    said light guides in said back panel being disposed for receiving the light from said light source and from said top panel light guides; and
    a light blocking arrangement in said back panel and cooperating with said light guides therein for conditioning the light directed on the depiction into one of full illumination and of any combination of highlighting, shadowing and dramatic illumination thereof.

2. A frame according to claim 1 in which:
    said light source comprises an elongated source of light;
    each of said light guides comprises an optical lighting film having prism grooves and a mirror-like finish on opposite surfaces thereof;
    said grooves in said bottom lens panel light guides extend parallel to said elongated light source and parallelly between said side panels;
    said grooves in said side panel light guides extend perpendicularly to said elongated light source and parallelly between said bottom lens and top panels;
    said grooves in said top panel light guides extend perpendicularly to said elongated light source and parallelly between said front and back panels;
    said grooves in said back panel light guides extend perpendicularly to said elongated light source and parallelly between said top and said bottom lens panels; and said grooves in said front panel light guides extend perpendicularly to said elongated light source and parallelly between said top and said bottom lens panels.

3. A frame according to claim 2 in which:

said bottom lens panel further includes a clear sheet adhered to said mirror-like surface of said optical lighting film;

each of said side panels further includes a white supporting base, an light extractor film adhered thereto and to said grooved surface of said optical lighting film, and a light extractor film adhered to said mirror-like surface of said optical lighting film;

said top panel further includes a supporting base, light extractor film adhered to said supporting base and to said grooved surface of said optical lighting film;

said back panel further includes a supporting base, two layers of light extractor film adhered to said supporting base and to said grooved surface of said optical lighting film, and a pattern of light extractor film adhered to said mirror-like surface of said optical lighting film; and said front panel further includes a translucent sheet adhered to said grooves of said optical lighting film.

4. A frame according to claim 3 in which: each of said supporting bases comprises a white surfaced ABS plastic;

said light extractor film comprises a durable, dimensionally stable, vinyl plastic;

said optical lighting film comprises a longitudinal hollow structure of transparent dielectric material having substantially planar inner and outer surfaces which are in octature; and said clear cover comprises one of an acrylic plastic and an optically clear glass.

5. A frame according to claim 1 in which said light source comprises an elongated source of light and each of said light guides comprises an optical lighting film having prism grooves and a mirror-like finish on opposite surfaces thereof.

6. A frame according to claim 1 in which said light source comprises an elongated source of light, each of said light guides comprises an optical lighting film having prism grooves and a mirror-like finish on opposite surfaces thereof, and said grooves in said bottom lens panel light guides extend parallel to said elongated light source and parallelly between said side panels.

7. A frame according to claim 6 in which said bottom lens panel further includes a clear sheet adhered to said mirror-like surface of said optical lighting film.

8. A frame according to claim 1 in which said light source comprises an elongated source of light, each of said light guides comprises an optical lighting film having prism grooves and a mirror-like finish on opposite surfaces thereof, and said grooves in said side panel light guides extend perpendicular to said elongated light source and parallelly between said bottom lens and top panels.

9. A frame according to claim 8 in which each of said side panels further includes a white base, a light extractor film adhered thereto and to said grooved surface of said optical lighting film and a light extractor film adhered to said mirror-like surfaces of said optical lighting film.

10. A frame according to claim 1 in which said light source comprises an elongated source of light, each of said light guides comprises an optical lighting film having prism grooves and a mirror-like finish on opposite surfaces thereof, and said grooves in said top panel light guides extend perpendicularly to said elongated light source and parallelly between said front and back panels.

11. A frame according to claim 10 in which said top panel further include a supporting base and a light extractor film adhered to said supporting base and to said grooved surface of said optical lighting film.

12. A frame according to claim 1 in which said light source comprises an elongated source of light, each of said light guides comprises an optical lighting film having prism grooves and a mirror-like finish on opposite surfaces thereof, and said grooves in said back panel light guides extend perpendicularly to said elongated light source and parallelly between said top and said bottom lens panels.

13. A frame according to claim 12 in which said back pane further includes a supporting base, two layers of light extractor film adhered to said supporting base and to said grooved surface of said optical lighting film, and a pattern of light extractor film adhered to said mirror-like surface of said optical lighting film to provide one of a uniform full illumination and of any combination of highlighting, shadowing and dramatic illumination of the depiction.

14. A frame according to claim 1 in which said light source comprises an elongated source of light, each of said light guides comprises an optical lighting film having prism grooves and a mirror-like finish on opposite surfaces thereof, and said grooves in said front panel light guides extend perpendicularly to said elongated light source and parallelly between said top and said bottom lens panels.

15. A frame according to claim 14 in which said front panel further includes a translucent sheet adhered to said grooved surface of said optical lighting film.

16. A compact, light efficient, illuminated transparency frame for illuminating a depiction, comprising:

a source of light;

a plurality of panels provided with light guides disposed to unattenuatedly receive and selectively transmit and reflect the light, and formed into an enclosure having an open interior for receipt of the light therein, said panels including a front panel for supporting the depiction to be illuminated thereby and a back panel;

said light guides in said back panel disposed to receive the light; and a light block arrangement in said back panel and cooperating with said light guides therein for selective conditioning of the light directed on the depiction into one of full illumination and any combination of highlighting, shadowing and dramatic illumination thereof.

17. A frame according to claim 16 wherein said light guides are disposed to guide the light into said front and back panels from opposite sides thereof.

18. A compact, light efficient, illuminated transparency frame for illuminating a depiction, comprising:

a plurality of panels provided with light guides and formed into an enclosure having an open interior for receipt of light therein, said panels including a front panel for supporting the depiction to be illuminated thereby and a back panel;

all of said light guides including an optical lighting film having a mirror-like smooth side and an opposite grooved side;

some of said light guides include a light extractor film in contact with said grooved side for reflecting the light into the optical lighting film;

some of said light guides, which include said light extractor film in contact with said grooved side, further include further extractor film in contact with said mirror-like smooth side for acting as a tube of conduit wall for said optical lighting film to help direct the light along said grooves and for permitting some of the light to be extracted out of the optical lighting film and directly to said front panel;

said light guides in said back panel being disposed to receive the light; and a light blocking arrangement in said back panel and cooperating with said light guides therein for selective conditioning of the light directed on the depiction into one of full illumination and any combination of highlighting, shadowing and dramatic illumination thereof.

19. A frame according to claim 18 in which portions of said mirror-like smooth side in said back panel are roughened for further conditioning the directed light.

20. A frame according to claim 18 further including a frame having channels therein for respective reception of said panels.

21. A frame according to claim 20 in which each of said panels includes a base having ears which extend outwardly from said light guides and which are disposed to be received within said channels.

22. A frame according to claim 21 in which selected ones of said bases include at least one tongue which extends beyond at least an adjacent one of said panels at the intersection thereof for blocking escape of light therefrom.

* * * * *